(12) United States Patent
Wei (10) Patent No.: US 10,148,494 B2
(45) Date of Patent: Dec. 4, 2018

(54) WIRELESS NETWORK ENVIRONMENT CONFIGURATION SYSTEM AND METHOD THEREOF

(71) Applicant: MOXA INC., New Taipei (TW)

(72) Inventor: Hsiang-En Wei, New Taipei (TW)

(73) Assignee: MOXA INC., New Taipei (TW)

( * ) Notice: Subject to any disclaimer, the term of this patent is extended or adjusted under 35 U.S.C. 154(b) by 0 days.

(21) Appl. No.: 15/469,473

(22) Filed: Mar. 24, 2017

(65) Prior Publication Data

US 2018/0241620 A1 Aug. 23, 2018

(30) Foreign Application Priority Data

Feb. 17, 2017 (TW) .............................. 106105166 A (51) Int. Cl.
*H04W 84/12* (2009.01)
*H04L 12/24* (2006.01)
*H04L 29/06* (2006.01)
*H04W 12/04* (2009.01)
*H04W 84/18* (2009.01)
*H04W 24/08* (2009.01)
*H04W 88/12* (2009.01)
*H04W 88/02* (2009.01)

(52) U.S. Cl.
CPC ...... *H04L 41/0803* (2013.01); *H04L 63/0442* (2013.01); *H04W 12/04* (2013.01); *H04W 84/18* (2013.01); *H04L 2209/80* (2013.01); *H04W 24/08* (2013.01); *H04W 84/12* (2013.01); *H04W 88/02* (2013.01); *H04W 88/12* (2013.01)

(58) Field of Classification Search
None
See application file for complete search history.

(56) References Cited

U.S. PATENT DOCUMENTS

| 2010/0202310 A1* | 8/2010 | Lee ........................ H04L 47/788 370/252 |
| 2010/0278075 A1* | 11/2010 | Ikeda ...................... H04L 41/12 370/254 |
| 2012/0140745 A1* | 6/2012 | Jeon ........................ H04W 8/005 370/336 |

(Continued)

*Primary Examiner* — Ayanah S George
(74) *Attorney, Agent, or Firm* — Chih Feng Yeh; Huntington IP Consulting Co., Ltd.

(57) ABSTRACT

A wireless network environment configuration system and method thereof are disclosed. A network device receives the network environment configuration from a master access point (AP) when the network device is in AP mode and the master AP exists; and the network device scans the wireless network to obtain a wireless network report when the master AP does not exist, and the network device calculates channels that are appropriate for all network device according to the wireless network report so as to generate the network environment configuration to transmit to all network devices in AP mode; and the network device connects with other network device in AP mode and having the network environment configuration to receive and store the network environment configuration when the network device in STA mode and the network environment configuration does not exist. Thus, the system and method thereof can improve convenience in setting wireless network.

10 Claims, 7 Drawing Sheets

(56) References Cited

U.S. PATENT DOCUMENTS

2013/0185556 A1* 7/2013 Eigle ................... H04W 12/02
713/168
2015/0282164 A1* 10/2015 Lee ...................... H04W 72/08
370/329

* cited by examiner

|  | Channel 1 | Channel 2 | Channel 3 | Channel 4 | Channel 5 | Channel 6 |
|---|---|---|---|---|---|---|
| Network device A | good | good | bad | rejected | good | bad |
| Network device B | good | rejected | bad | good | bad | bad |
| Network device C | good | rejected | good | good | bad | bad |
| Network device D | good | rejected | bad | good | rejected | bad |
| Total score | 12 | 3 | 6 | 9 | 5 | 4 |

301

| Channel combination | Total score |
|---|---|
| 1, 3, 5 | 23 |
| 1, 3, 6 | 22 |
| 2, 4, 6 | 16 |

WIRELESS NETWORK ENVIRONMENT CONFIGURATION SYSTEM AND METHOD THEREOF

CROSS-REFERENCE TO RELATED APPLICATIONS

The present application is based on, and claims priority from, Taiwan Application Serial Number 106105166, filed Feb. 17, 2017, the disclosure of which is hereby incorporated by reference herein in its entirety.

BACKGROUND

1. Technical Field

The present disclosure relates to a network environment configuration system and a method thereof, more particularly to a wireless network environment configuration system which is able to calculate channels appropriate to all access points and provide a network environment configuration, and a method thereof.

2. Description of Related Arts

In recent years, wireless network technology is rapidly developed and popularized, so various wireless network devices are available in markets.

Generally speaking, setup of wired network is simpler than that of wireless network. That is because the setup of wireless network requires sufficient knowledge to set relevant parameters correctly. Furthermore, compared with the wired network, the wireless network may be interfered more easily, for this reason, the user must operate auxiliary equipment to check which channel is clean and available to use before setup of the wireless network. Hence, the setup of wireless network is inconvenient.

In order to solve aforementioned problem, there are manufacturers developing technology to solve the problem, and in that technology, preset parameters are transmitted to other wireless network devices, that is, the user just needs to set the parameters once, and later, the user may presses a physical button to automatically receive the parameters to complete setup. However, that technology still requires the user to set correct parameters in advance, if the user does not have knowledge about the wireless network or auxiliary equipment, it is still difficult for the user to set the initial parameters correctly and adjust the appropriate channels when the wireless network environment is changed. Therefore, the problem of inconvenient setup of the wireless network is not solved effectively.

In conclusion, as can be known, the prior art has the problem of inconvenient setup of the wireless network; therefore, it is necessary to propose an improved technical solution to resolve the problem.

SUMMARY

In order to solve aforementioned problem, the present disclosure is to provide a wireless network environment configuration system and a method thereof.

The wireless network environment configuration system of the present disclosure is applied to a plurality of network devices in wireless network environment, and each network device includes an access point (AP) mode and a station (STA) mode. The wireless network environment configuration system comprises an initialization module, an access point module, a station module and a processing module. When the network device is activated, the initialization module sets the network device to the AP mode or the STA mode and checks whether a network environment configuration exists. When the network device is in the AP mode and the network environment configuration does not exist, the access point module detects whether a master access point having the network environment configuration exists; when the master access point exists, the access point module receives the network environment configuration from the master access point and stores the network environment configuration, and when the master access point does not exist, the access point module scans the wireless network environment to obtain at least one wireless network report, and calculates a plurality of channels appropriate to all network devices by a channel algorithm according to the at least one wireless network report, and generates the network environment configuration according to the plurality of channels, and transmits the network environment configuration to all network devices in the AP mode. When the network device is in the STA mode and the network environment configuration does not exists, the station module detects and interconnects other network device in the AP mode and having the network environment configuration, and receives the network environment configuration from the interconnected network device and stores the network environment configuration. Under a condition that the network environment configuration exists, the processing module permits the network device to interconnect with other network device in the STA mode when the network device is in the AP mode, and permits the network device to interconnect with at least one terminal device to provide wireless network when the network device is in the STA mode.

The present disclosure further provides a wireless network environment configuration method which is applied to a plurality of network devices in wireless network environment. Each network device includes an AP mode and an STA mode. The wireless network environment configuration method includes following steps: setting the network device to the AP mode or the STA mode when the network device is activated, and checking whether a network environment configuration exists; when the network device is in the AP mode and the network environment configuration does not exist, detecting whether a master access point having the network environment configuration exists, and when the master access point exists, receiving the network environment configuration from the master access point and storing the received network environment configuration, and when the master access point does not exist, scanning the wireless network environment to obtain at least one wireless network report, calculating a plurality of channels appropriate to all network device by a channel algorithm according to the at least one wireless network report, generating the network environment configuration according to the plurality of channels, and transmitting the network environment configuration to all network devices in AP mode; when the network device is in the STA mode and the network environment configuration does not exist, detecting and interconnecting other network device in the AP mode and having the network environment configuration, and receiving the network environment configuration from the interconnected network device and storing the received network environment configuration; and under a condition that the network environment configuration exists, when the network device is in the AP mode, permitting the network device to interconnect with other network device in the STA mode to provide the network environment configuration, and when the network device is in the STA mode, permitting the network device to interconnect with at least one terminal device to provide the wireless network.

To summarize, the difference between the conventional technology and the present disclosure is that the wireless network environment configuration system receives the network environment configuration or automatically generates the network environment configuration to set up the wireless network, wherein when the network device is in the AP mode and the master access point exists, the wireless network environment configuration system receives the network environment configuration from the master access point, when the master access point does not exist, the wireless network environment configuration system scans the wireless network environment for obtaining the wireless network reporting, calculates the plurality of channels appropriate to all network devices based on the wireless network report to generate a network environment configuration and transmit the network environment configuration to all network devices in the AP mode. When the network device is in STA mode and the network environment configuration does not exist, the network device is connected to other network device in AP mode and having the network environment configuration to receive and store the network environment configuration.

By aforementioned technology means, the present disclosure may achieve a technical effect of improving convenience in setting wireless network.

BRIEF DESCRIPTION OF THE DRAWINGS

The structure, operating principle and effects of the present disclosure will be described in detail by way of various embodiments which are illustrated in the accompanying drawings.

DETAILED DESCRIPTION

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Application environment of the present disclosure is described prior to the illustration of the wireless network environment configuration system and method thereof of the present disclosure. The technology of the present disclosure is applied to a plurality of network devices of the wireless network environment, and each network device includes an access point (AP) mode and a station (STA) mode, and automatically obtain parameters of the network environment configuration, such as request to send (RTS), clear to send (CTS), Tx power, service set identifier (SSID), network password, channel, bandwidth, data rate, roaming parameter in STA mode, and so on, so that the network device in AP mode and the network device in STA mode can be interconnected with each other with high efficiency and low interference. Generally speaking, the network device in AP mode may be regarded as a wireless network access point which is able to interconnect with wired network and wireless network and has roaming capability. The network device in STA mode may be regarded as a wireless network card and used to provide wireless network to computer equipment, such as personal computer, tablet computer, notebook computer, smartphone, personal digital assistant and so on.

The wireless network environment configuration system and the method thereof of the present disclosure will hereinafter be described in more detail, with reference to the accompanying drawings. Please refer to FIG. 1, which is a system block diagram of the wireless network environment configuration system of the present disclosure. The wireless network environment configuration system is applied to a plurality of network devices 100 in wireless network environment, and each network device 100 includes an AP mode and an STA mode. The wireless network environment configuration system includes an initialization module 110, an access point module 120, a station module 130 and a processing module 140. When the network device 100 is activated, the initialization module 110 sets the network device 100 to AP mode or STA mode, and checks whether the network environment configuration exists. In the actual implementation, the network environment configuration means related settings, channels, and channel allocation of the wireless network used by the network device 100 in AP mode, and other network device 100 in STA mode may interconnect the network device 100 in AP mode to use wireless network. The network device 100 in AP mode may transmit the network environment configuration to the network device 100 in STA mode to complete setup of wireless network. It is to be noted that the way of setting AP mode or STA mode includes pressing a physical button of the network device 100, clicking a button shown on graphic user interface, and so on.

Figure 1:
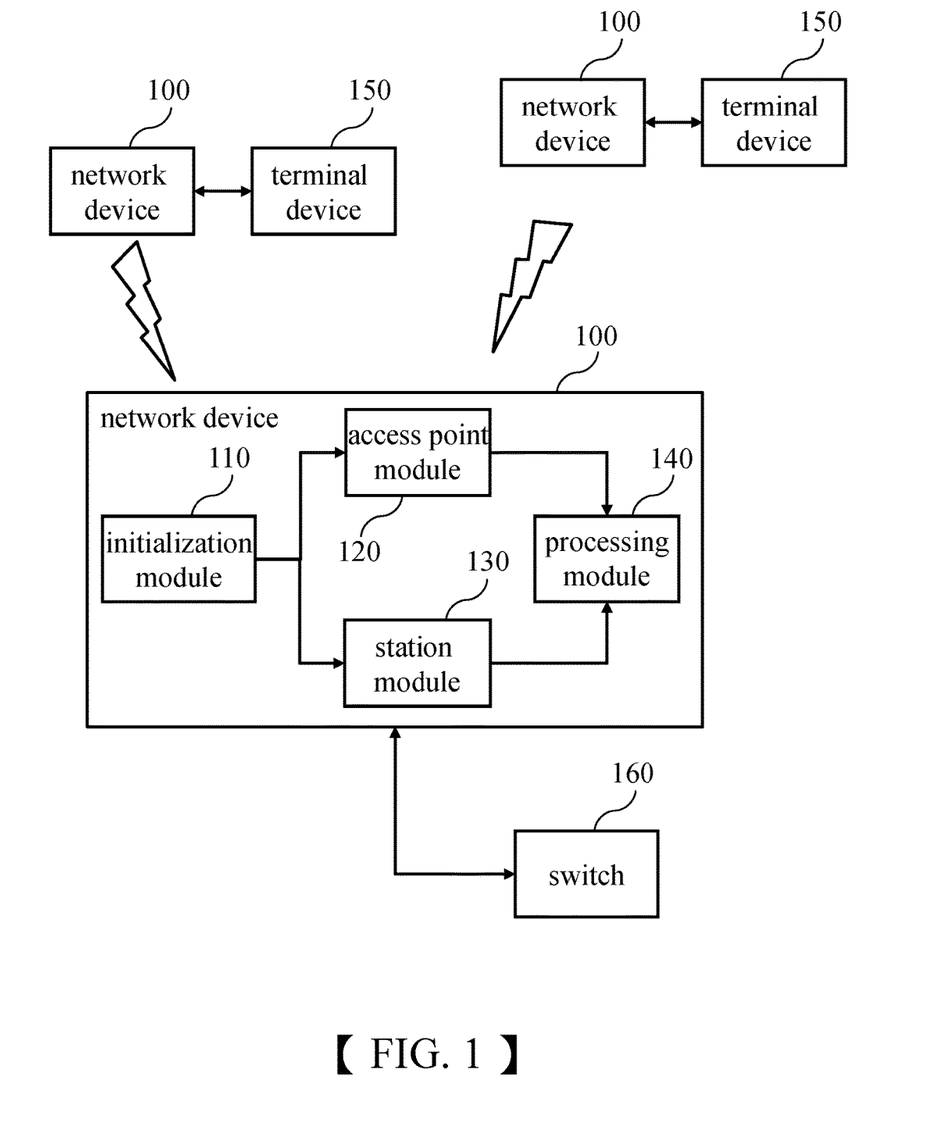
FIG. 1 is a system block diagram of a wireless network environment configuration system of the present disclosure.

When the network device 100 is in AP mode and the network environment configuration does not exist, the access point module 120 detects whether a master access point having the network environment configuration exists; when the master access point exists, the access point module 120 receives the network environment configuration from the master access point and stores the network environment configuration; when the master access point does not exist, the access point module 120 scans the wireless network environment to obtain at least one wireless network report, calculates a plurality of channels, which is appropriate to all network devices 100, by a channel algorithm according to the at least one wireless network report, generates the network environment configuration according to the channels, and then transmits the network environment configuration to all network devices 100 in AP mode. In the actual implementation, the master access point is a network device 100 having the network environment configuration and in AP mode. If there are a plurality of network devices 100 satisfying the condition in the wireless network environment, one of such network devices 100 may be selected as the master access point. In addition, After the access point module 120 calculates the plurality of channels, the network devices 100 in AP mode may be assigned different channels averagely, thereby avoiding adjacent network devices 100 in AP mode from using the same channel. For example, suppose that there are three network devices 100 and the access point module 120 calculates three channels, such as channel one through three, and each network device 100 use different channel.

When the network device 100 is in STA mode and the network environment configuration does not exist, the station module 130 detects other network device 100 having the network environment configuration and in AP mode, and then interconnects with the detected network device 100 to receive the network environment configuration from the interconnected network device 100 and stored the received network environment configuration. In other words, the network device 100 in STA mode and without network environment configuration may detect and interconnect with other network device 100 in AP mode and having the network environment configuration, thereby obtaining the network environment configuration of the detected network device 100 and storing the received network environment configuration as its owned network environment configuration.

Suppose that the network device 100 is in AP mode, when the network environment configuration exists, the processing module 140 of the network device 100 permits other network device 100 in STA mode to interconnect with the network device 100, and the network device 100 may provide network environment configuration to other network device 100. Suppose that the network device 100 is in STA mode, the processing module 140 of the network device 100 permits a terminal device 150 to interconnect with the network device 100, and the network device 100 provides wireless network to the terminal device 150 for use. As a result, the terminal device 150 may be interconnected to the wired or wireless network through the network device 100 in STA mode, the network device 100 in AP mode, and a switch 160 in sequential order. Different terminal devices 150 may be interconnected with each other to transmit network packet via the network device 100 in the AP mode (i.e., an AP) through the network devices 100, which are interconnected to the different terminal devices 150 separately.

It is to be noted that the initialization module 110, the access point module 120, the station module 130 and the processing module 140 may be implemented by various manners including software, hardware or combination thereof; for example, in an embodiment, these modules may be implemented by integrated circuit (IC) chip, application specific integrated circuit (ASIC), system on chip (SoC), and so on; in an embodiment, these modules may be implemented by computer program executed on computer hardware, and the computer program includes computer readable and executable instructions which may be stored in computer readable storage medium, such as flash disk, hard disk, RAM memory, optical disk, floppy disc, hole puncher and so on.

Figure 2:
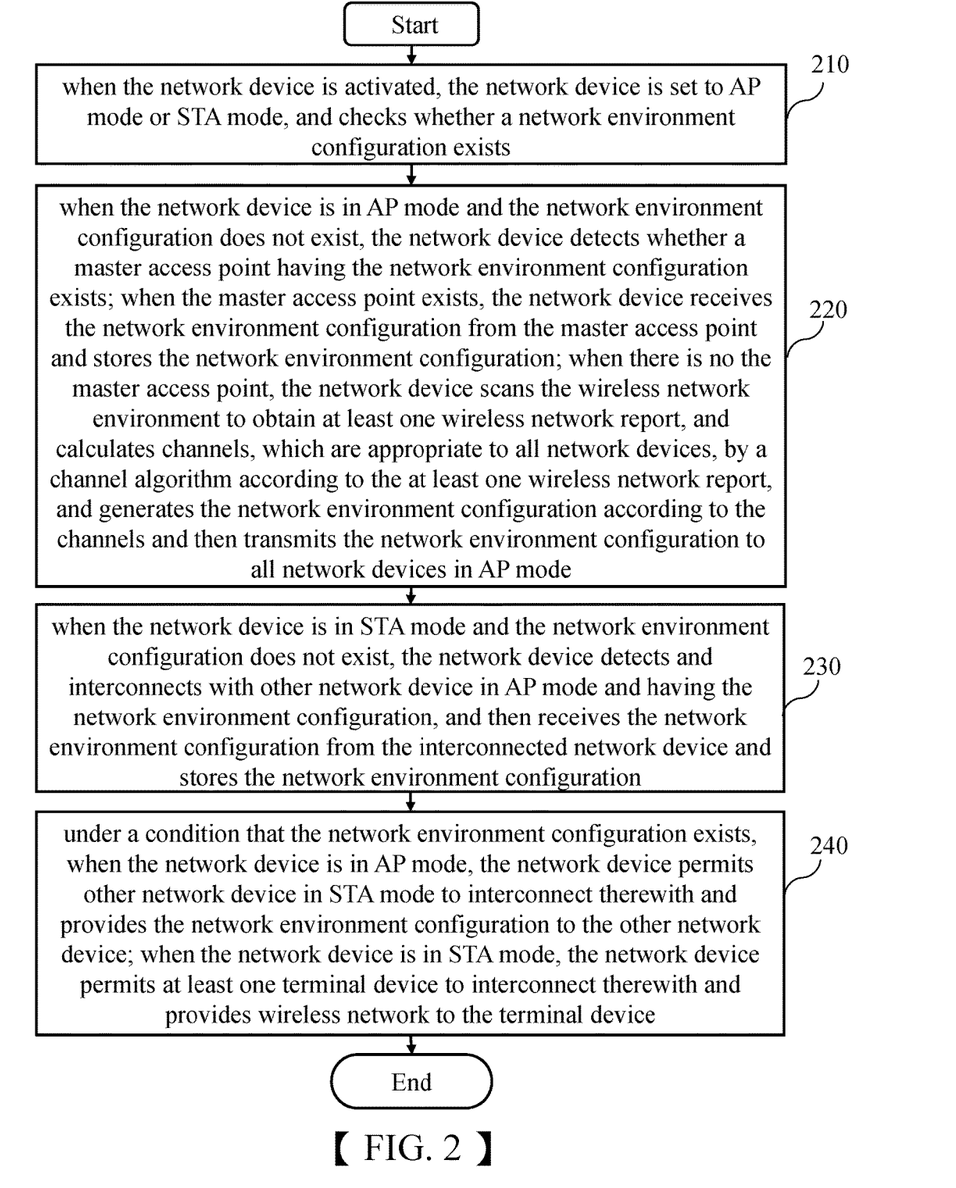
FIG. 2 is a flowchart showing the steps in an operation of a wireless network environment configuration method of the present disclosure.

Please refer to FIG. 2, which is a flowchart showing the steps in an operation of wireless network environment configuration method of the present disclosure. The wireless network environment configuration method is applied to a plurality of network devices 100 in wireless network environment, and each network device 100 includes an AP mode and an STA mode. The wireless network environment configuration method includes following steps. In a step 210, when the network device 100 is activated, the network device 100 is set to AP mode or STA mode, and checks whether a network environment configuration exists. In a step 220, when the network device 100 is in AP mode and the network environment configuration does not exist, the network device 100 detects whether a master access point having the network environment configuration exists; when the master access point exists, the network device 100 receives the network environment configuration from the master access point and stores the network environment configuration; when there is no the master access point, the network device 100 scans the wireless network environment to obtain a wireless network report, and calculates channels, which are appropriate to all network devices 100, by a channel algorithm according to the wireless network report, generates the network environment configuration according to the channels and then transmits the network environment configuration to all network devices 100 in AP mode. In a step 230, when the network device 100 is in STA mode and the network environment configuration does not exist, the network device 100 detects and interconnects with other network device 100 in AP mode and having the network environment configuration, and then receives the network environment configuration from the interconnected network device 100 and stores the network environment configuration. In a step 240, under a condition that the network environment configuration exists, when the network device 100 is in AP mode, the network device 100 permits other network device 100 in STA mode to interconnect therewith and provides the network environment configuration to the other network device 100; when the network device 100 is in STA mode, the network device 100 permits a terminal device 150 to interconnect therewith and provides wireless network to the terminal device 150. Through aforementioned steps, the network device 100 may receive network environment configuration or automatically generate the network environment configuration for setup of the wireless network. When the network device 100 is in AP mode and the master access point exists, the network device 100 receives the network environment configuration from the master access point; when the master access point does not exist, the network device 100 scans the wireless network environment to obtain the wireless network report, calculates channels, which are appropriate to all network devices 100, according to the wireless network report, and generates and transmits the network environment configuration to all network devices 100 in AP mode; when the network device 100 is in STA mode and the network environment configuration does not exist, the network device 100 interconnects with other network device 100 in AP mode and having the network environment configuration, and receives the network environment configuration from the other network device 100 in AP mode, and stores the received network environment configuration.

Figure 3:
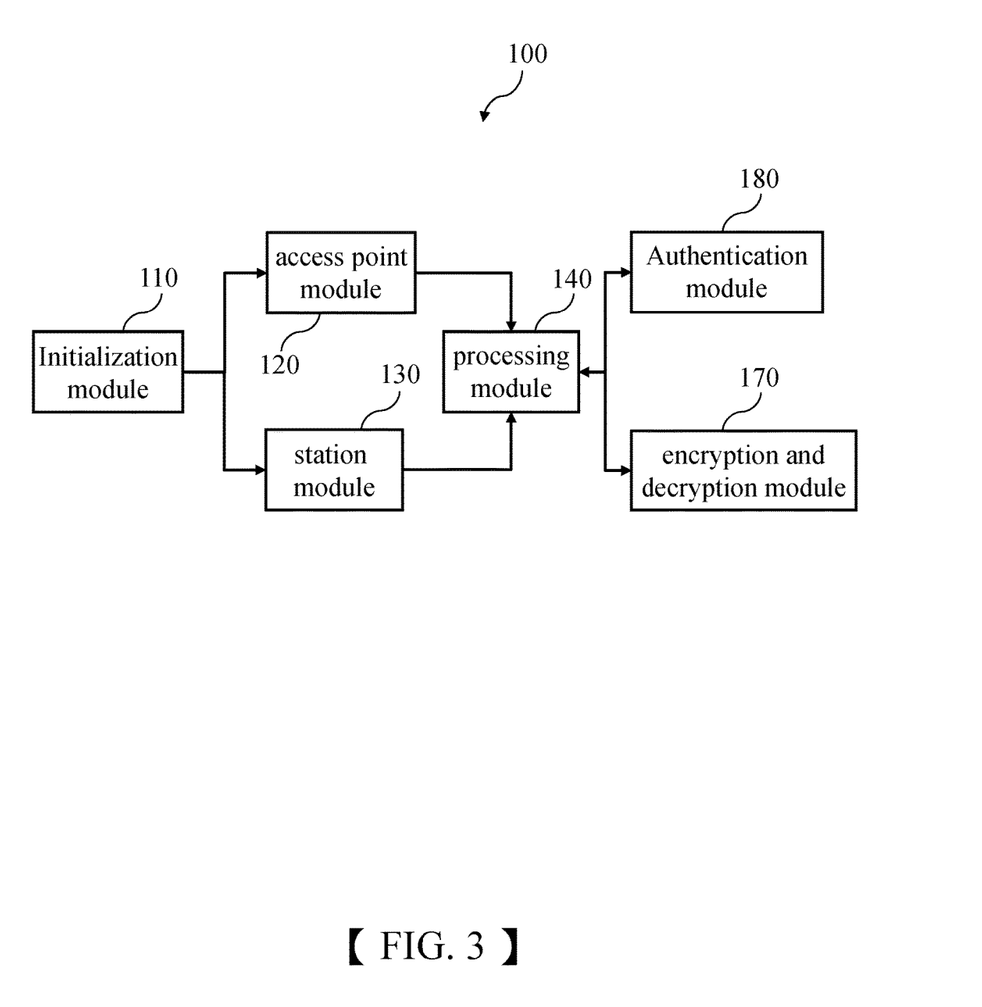
FIG. 3 is a system block diagram of other embodiment of the wireless network environment configuration system of the present disclosure.

The following refer to FIGS. 3-7. FIG. 3 is a system block diagram of other embodiment of the wireless network environment configuration system of the present disclosure. In the actual implementation, the wireless network environment configuration system may further include an encryption and decryption module 170. For every interconnection, the encryption and decryption module 170 generates a key pair to encrypt or decrypt content of a packet. The key pair includes a public key and a private key generated by using asymmetric encryption, such as RSA algorithm. Besides, the wireless network environment configuration system may further include an authentication module 180. When the network device 100 transmits the packet, the authentication module 180 generates ciphertext corresponding to the network device 100 in AP mode and the network device 100 in STA mode respectively according to a predetermined encoding rule; and when the network device 100 receives the packet, the authentication module 180 decodes the received ciphertext according to a predetermined decoding rule, thereby confirming whether the network device 100 is manufactured by the same manufacturer or has the same encoding/decoding rule. As a result, even if the private key is leaked, other network device 100 without the same encoding/decoding rule is unable to obtain the network environment configuration.

Figure 4:
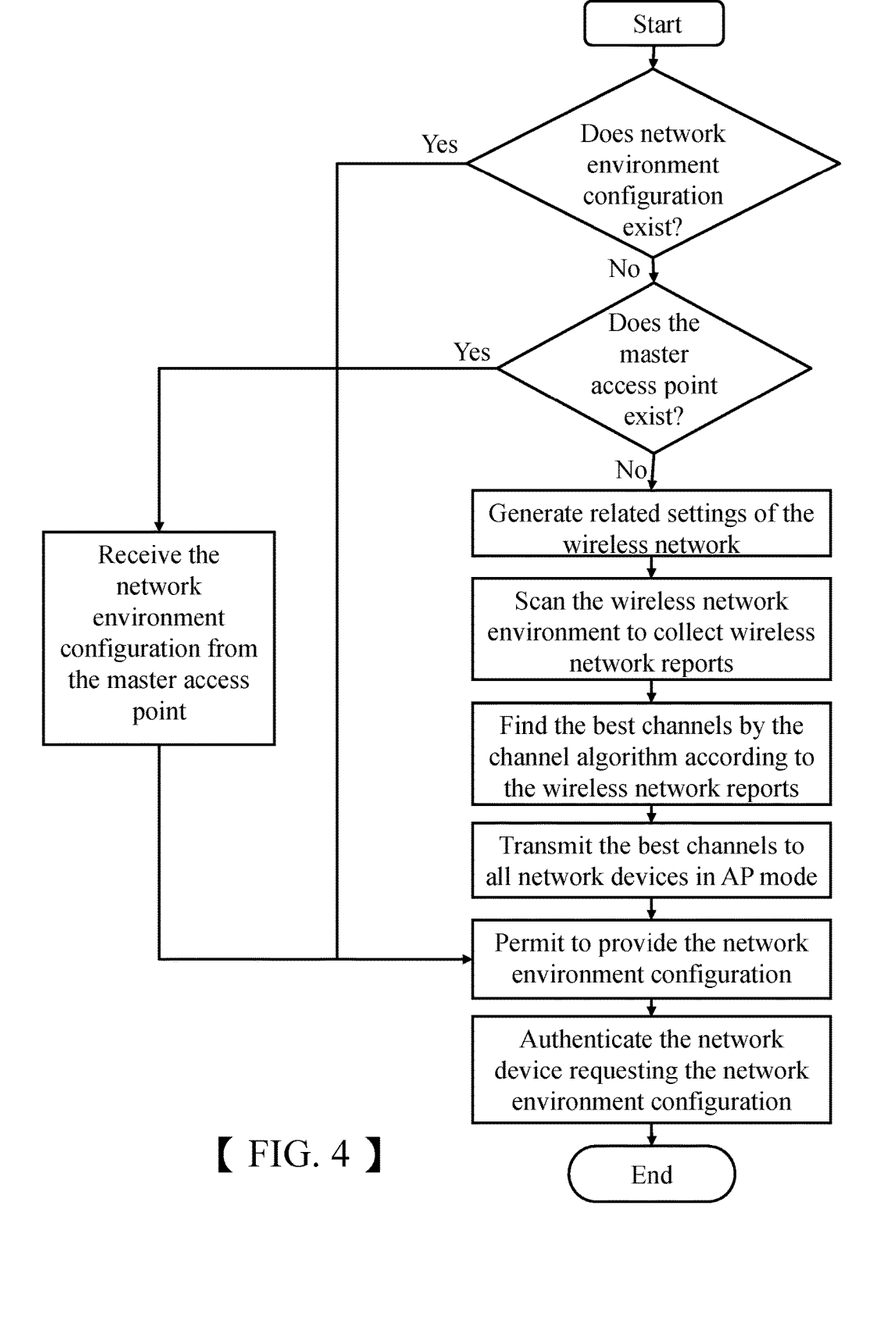
FIG. 4 is a flowchart showing the steps in an operation of the network device in AP mode, in accordance with the present disclosure.

FIG. 4 is a flowchart showing the steps in an operation of the network device in AP mode, in accordance with the present disclosure. When the user activates the network device 100 which applies the technology of the present disclosure, and sets the network device 100 to AP mode, the network device 100 starts to check whether the network environment configuration exists; when the network environment configuration exists, the network device 100 is permitted to provide the network environment configuration thereof to other network device 100; otherwise, when the network environment configuration does not exist, it indicates that wireless network is not set, the network device 100 detects whether the master access point exists. When the master access point exists, the network device 100 receives the network environment configuration from the master access point; when the master access point does not exist, the network device 100 generates related settings of the wireless network, such as RTS, CTS, Tx power and so on; next, the network device 100 scans the wireless network environment to collect wireless network reports responded from all network devices 100 in AP mode, and then finds the best channels by the channel algorithm according to the wireless network reports, and transmits the best channels to all network devices 100 in AP mode, and permits network device 100 to provide the network environment configuration to other network device 100 which sends a request. In the actual implementation, in order to check whether the network devices 100 are manufactured by the same manufacturer, the network device sending the request for the network environment configuration may be authenticated by, for example, the key pair, encoding/decoding rule, and so on.

Figure 5:
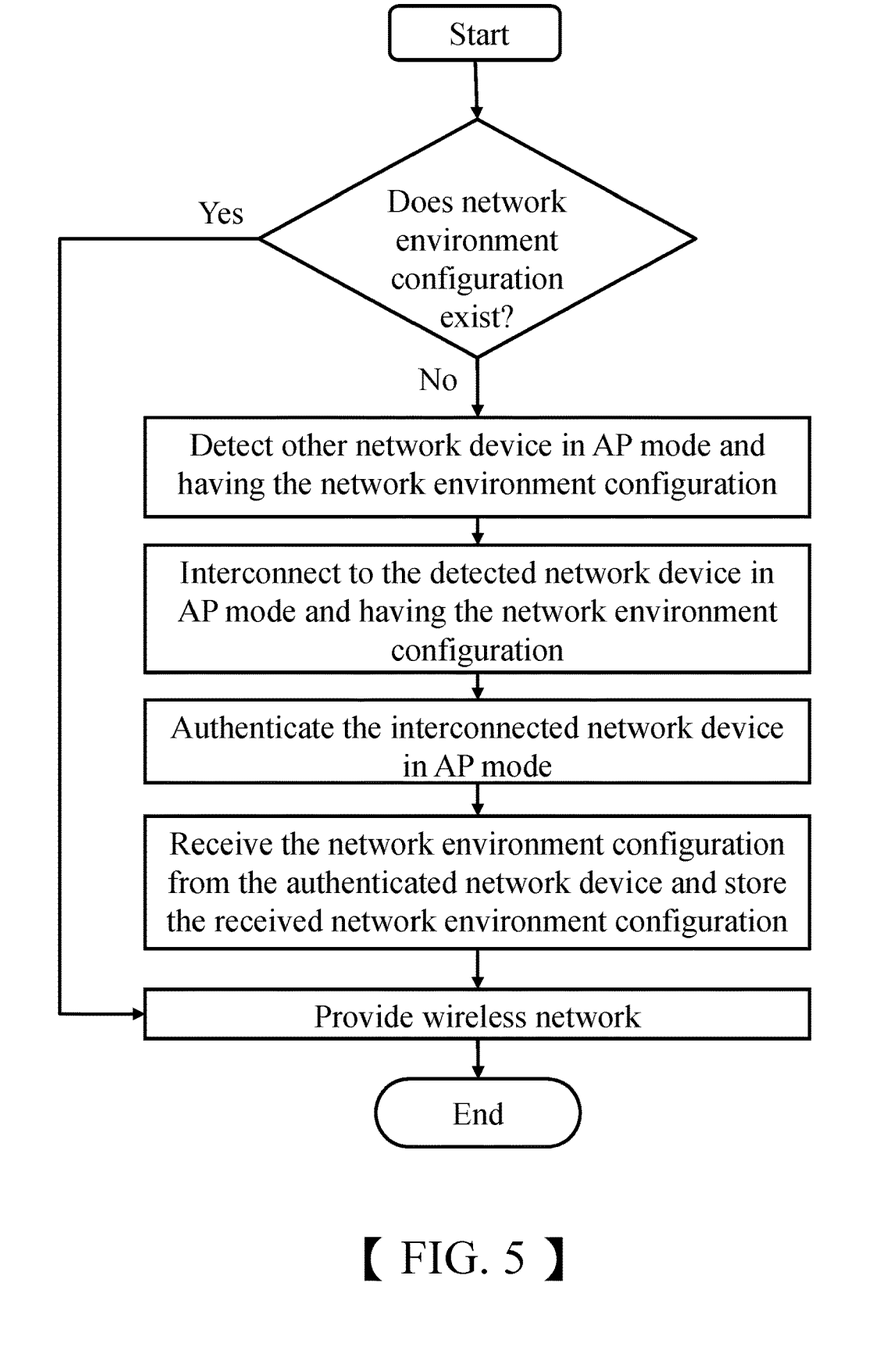
FIG. 5 is a flowchart showing the steps in an operation of the network device in STA mode, in accordance with the present disclosure.

FIG. 5 is a flowchart showing the steps in an operation of the network device in STA mode, in accordance with the present disclosure. When the user activates the network device 100 which applies the technology of the present disclosure and sets the network device 100 to STA mode, the network device 100 checks whether the network environment configuration exists; if the network environment configuration exists, the network device 100 directly provides the terminal device 150 to use wireless network; if the network environment configuration does not exist, the network device 100 detects and interconnects to other network device 100 in AP mode and having the network environment configuration, and authenticates the interconnected network device 100 in AP mode, and receives the network environment configuration from the authenticated network device 100 and stores the received network environment configuration, thereby completing setup of the wireless network to provide wireless network.

Figure 6:
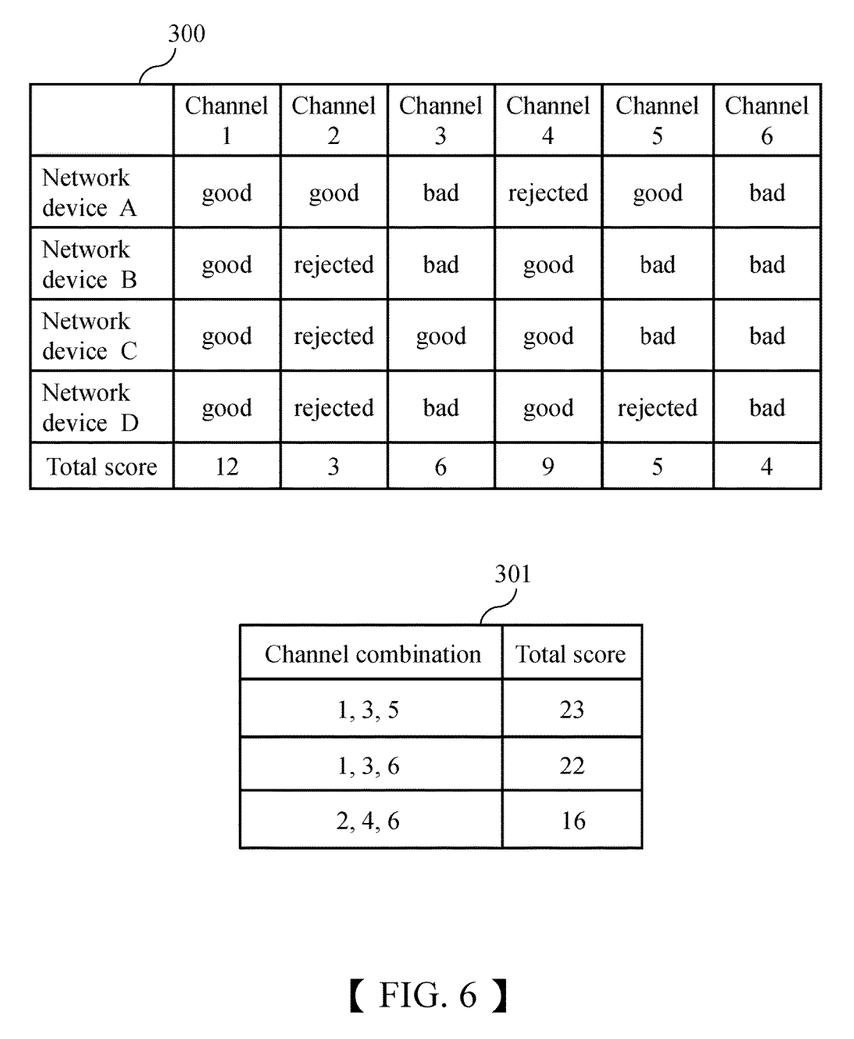
FIG. 6 is a schematic view of channels appropriate to all network devices and calculated based on a channel algorithm according to a wireless network report, in accordance with the present disclosure.

FIG. 6 is a schematic view of channels appropriate to all network devices and calculated by the channel algorithm according to the wireless network report. In the actual implementation, each network device 100 in AP mode scans the wireless network environment to generate the wireless network report 300 which includes signal statuses of different channels in the wireless network environment. For example, the signal status of the channel may be "good", "rejected", or "bad". Each signal status corresponds to a score, for example, a score of the "good" signal status is 3, a score of the "rejected" signal status is 0, and a score of the "bad" signal status is 1. For example, as shown in FIG. 6, the signal statuses of channels 1-6 detected by the network device A are good, good, bad, rejected, good, and bad, respectively; the signal statuses of channels 1-6 detected by the network device B are good, rejected, bad, good, bad, and bad, respectively; the signal statuses of channels 1-6 detected by the network device C are good, rejected, good, good, bad, and bad, respectively; the signal statuses of channels 1-6 detected by the network device D are good, rejected, bad, good, rejected and bad, respectively. According to the wireless network report 300, the channel algorithm may be performed to calculate a total score of each channel (for example, total scores of channels 1-6 are 12, 3, 6, 9, 5 and 4, respectively) and total scores of different channel combinations (for example, as shown in table 301, a total score of combination of channels 1, 3 and 5 is 23; a total score of combination of channels 1, 3 and 6 is 22; a total score of combination of channels 2, 4 and 6 is 16), and then select the best channel combination (that is, the combination of channels 1, 3 and 5 with the highest total score) to generate the network environment configuration. It is to be noted that the signal status of the channel 5 detected by the network device D is "rejected", but one network device is only operated on one channel, so the channel combination including at least one "bad" or "good" signal status is adoptable for the network device, for this reason, the combination of channels 1, 3 and 5 may be selected.

Figure 7:
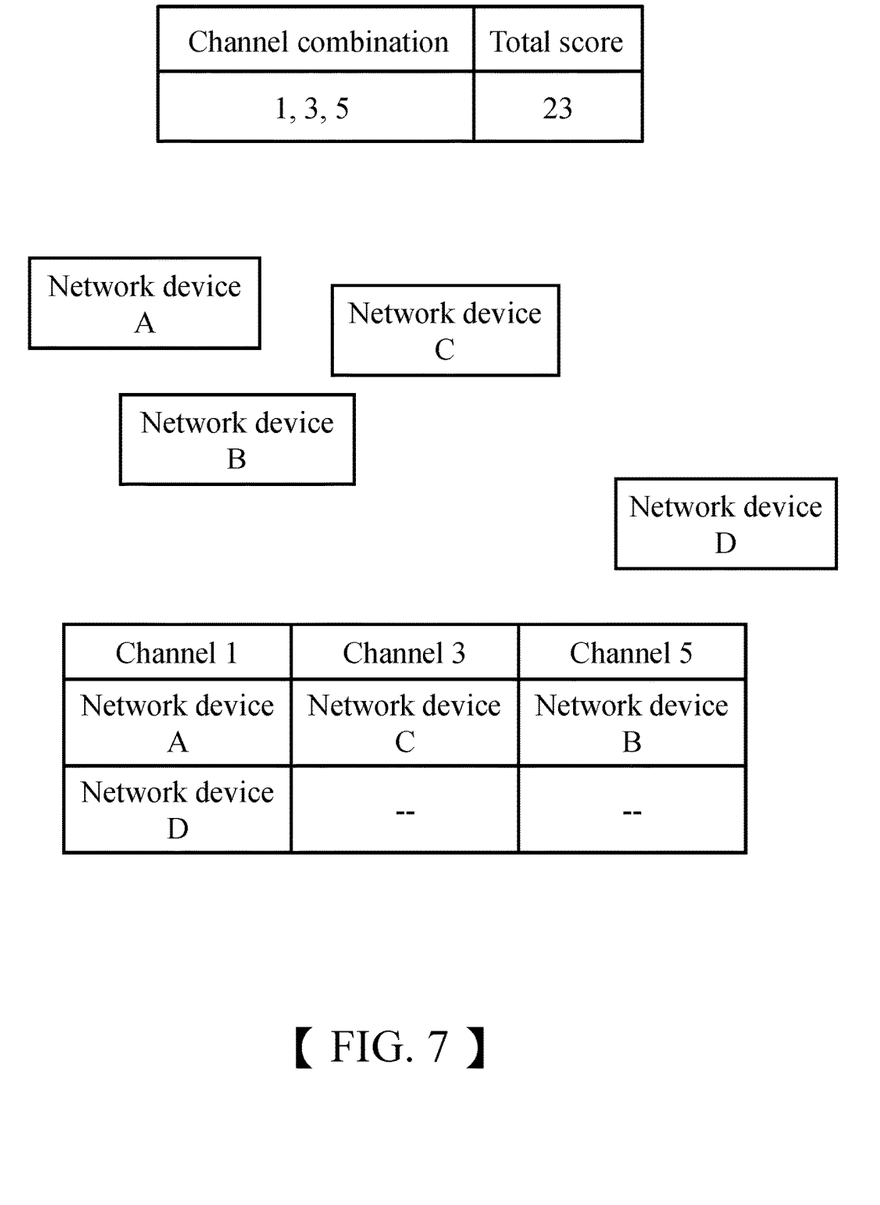
FIG. 7 is a schematic view of pairing between the network devices and a selected channel combination, in accordance with the present disclosure.

FIG. 7 is a schematic view of pairing between the selected channel combination and the network devices, in accordance with the present disclosure. The example shown in FIG. 6 is taken for illustration. When the channel combination with the highest score (that is, the combination of channels 1, 3, and 5) is found, the network devices are paired with the channels of the found channel combination according to degrees of preference of the network devices for these channels, distances between the network devices and average channel distribution. Suppose that the network devices A, B, C and D are disposed in physical positions as shown in FIG. 7, and the combination of channels 1, 3 and 5 is the best channel combination. The network devices A and D may use the channel 1, the network device C may use the channel 3, and the network device B may use the channel 5, that is, each of the network devices may select the preferable channel, adjacent network devices use different channels, and four network devices (the network devices A, B, C and D) are averagely distributed to use the three channels (the channels 1, 3 and 5). As a result, after the network devices complete the setup of wireless network, the network devices establish optimal wireless network architecture.

To summarize, the difference between the present disclosure and the conventional technology is that the wireless network environment configuration system of the present disclosure receives the network environment configuration or automatically generate the network environment configuration to setup wireless network, wherein when the network device 100 in AP mode and the master access point exist, the network device 100 receives the network environment configuration; and when the master access point does not exist, the network device 100 scans the wireless network environment to obtain the wireless network report, and calculates the plurality of channels appropriate to all network devices 100 according to the wireless network report, and then generates and transmits the network environment configuration to all network devices in AP mode, and when the network device 100 is in STA mode and the network environment configuration does not exist, the network device 100 interconnects to other network device 100 in AP mode and having network environment configuration, thereby receiving and storing the network environment configuration. Therefore, the wireless network environment configuration system and method thereof of the present disclosure may solve conventional technology problem, and achieve technical effect of improving convenience in setting wireless network.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A wireless network environment configuration system, applied to a plurality of network devices in a wireless network environment, and each of the plurality of network devices comprising an access point (AP) mode and a station (STA) mode, and the wireless network environment configuration system comprising:

an initialization module configured to set the network device to the AP mode or the STA mode when the network device is activated, and check whether a network environment configuration exists;

an access point module, wherein when the network device is in the AP mode and the network environment configuration does not exist, the access point module detects whether a master access point having the network environment configuration exists, and when the master access point exists, the access point module receives the network environment configuration from the master access point and stores the network environment configuration, and when the master access point does not exist, the access point module scans the wireless network environment to obtain at least one wireless network report, and calculates a plurality of channels appropriate to all network devices by a channel algorithm according to the wireless network report, and generates the network environment configuration according to the plurality of channels, and transmits the network environment configuration to all network devices in the AP mode;

a station module, wherein when the network device is in the STA mode and the network environment configuration does not exist, the station module detects and interconnects other network device in the AP mode and having the network environment configuration, and receives the network environment configuration from the interconnected network device and stores the network environment configuration; and a processing module, configured to permit the network device to interconnect with other network device in the STA mode to provide the network environment configuration when the network device is in the AP mode under a condition that the network environment configuration exists, and permit the network device to interconnect with at least one terminal device to provide wireless network when the network device is in the STA mode.

2. The wireless network environment configuration system according to claim 1, further comprising an encryption and decryption module configured to generate a key pair to encrypt or decrypt content of a packet in every interconnection.

3. The wireless network environment configuration system according to claim 1, further comprising an authentication module configured to generate, according to a predetermined encoding rule, a ciphertext corresponding to the network device in the AP mode and the network device in the STA mode when the network device transmits a packet, and decode the ciphertext according to a predetermined decoding rule when the network device receives the packet.

4. The wireless network environment configuration system according to claim 1, wherein the access point module calculates the plurality of channels, and assigns the network devices in the AP mode to use different channels averagely, and avoids the adjacent network devices in the AP mode from using the same channel.

5. The wireless network environment configuration system according to claim 1, wherein the master access point is one of the network devices in the AP mode, the plurality of channels is calculated by the channel algorithm according to the wireless network reports generated from all network devices in the AP mode, and the network environment configuration is based on the plurality of channels.

6. A wireless network environment configuration method, applied to a plurality of network devices in wireless network environment, and each network device comprising an AP mode and an STA mode, and the wireless network environment configuration method comprising:

setting the network device to the AP mode or the STA mode when the network device is activated, and checking whether a network environment configuration exists;

when the network device is in the AP mode and the network environment configuration does not exist, detecting whether a master access point having the network environment configuration exists, and when the master access point exists, receiving the network environment configuration from the master access point and storing the received network environment configuration, and when the master access point does not exist, scanning the wireless network environment to obtain at least one wireless network report, calculating a plurality of channels appropriate to all network device by a channel algorithm according to the at least one wireless network report, generating the network environment configuration according to the plurality of channels, and transmitting the network environment configuration to all network devices in AP mode;

when the network device is in the STA mode and the network environment configuration does not exist, detecting and interconnecting other network device in the AP mode and having the network environment configuration, and receiving the network environment configuration from the interconnected network device and storing the received network environment configuration; and under a condition that the network environment configuration exists, when the network device is in the AP mode, permitting the network device to interconnect with other network device in the STA mode to provide the network environment configuration, and when the network device is in the STA mode, permitting the network device to interconnect with at least one terminal device to provide wireless network.

7. The wireless network environment configuration method according to claim 6, further comprising:

generating a key pair, in the network device, to encrypt or decrypt content of a packet in every interconnection.

8. The wireless network environment configuration method according to claim 6, further comprising:

according to a predetermined encoding rule, generating a ciphertext corresponding to the network device in the AP mode and the network device in the STA mode when the network device transmits a packet, and decoding the ciphertext according to a predetermined decoding rule when the network device receives the packet.

9. The wireless network environment configuration method according to claim 6, wherein the step of calculating the plurality of channels further comprises:

assigning the network devices in the AP mode to use different channels averagely, and avoiding the adjacent network devices in the AP mode from using the same channel.

10. The wireless network environment configuration method according to claim 6, wherein the master access point is one of the network devices in the AP mode, the plurality of channels is calculate by the channel algorithm according to the at least one wireless network report generated from all network devices in the AP mode, and the network environment configuration is based on the plurality of channels.

* * * * *